United States Patent [19]

Fitzgerald

[11] Patent Number: 4,466,051

[45] Date of Patent: Aug. 14, 1984

[54] REGULATED POWER SUPPLY INCORPORATING A POWER TRANSFORMER HAVING A TIGHTLY COUPLED SUPPLEMENTAL POWER TRANSFER WINDING

[75] Inventor: William V. Fitzgerald, Indianapolis, Ind.

[73] Assignee: RCA Corporation, New York, N.Y.

[21] Appl. No.: 436,757

[22] Filed: Oct. 25, 1982

[51] Int. Cl.³ .................................................. H02M 3/335
[52] U.S. Cl. ....................................................... 363/21
[58] Field of Search ............................... 363/18–21; 336/170, 220

[56] References Cited

U.S. PATENT DOCUMENTS

| | | | |
|---|---|---|---|
| 3,280,363 | 10/1966 | Powell | 336/220 X |
| 3,648,209 | 3/1972 | Conger | 336/220 |
| 3,678,429 | 7/1972 | Collin | 336/170 |
| 4,028,606 | 6/1977 | Beuchee et al. | 363/20 |
| 4,135,173 | 1/1979 | Phelp | 336/220 |
| 4,176,304 | 11/1979 | Scott | 315/411 |
| 4,236,198 | 11/1980 | Ohsawa et al. | 363/21 X |
| 4,312,029 | 1/1982 | Zellmer | 363/21 |
| 4,335,423 | 6/1982 | Koizumi et al. | 363/21 |

OTHER PUBLICATIONS

U.S. patent application, Ser. No. 426,360, Filed 9/29/82, in the Name of D. H. Willis, Entitled "Regulated Power Supply Circuit", RCA Docket No. 78,182.

Primary Examiner—William M. Shoop
Attorney, Agent, or Firm—Paul J. Rasmussen; Peter M. Emanuel; Scott J. Stevens

[57] ABSTRACT

A regulated power supply for a television receiver includes a transformer having a primary winding coupled to a source of unregulated voltage. A transistor switch controls the interval during which the unregulated voltage causes current to flow in the primary winding. By transformer action, power is transferred to secondary windings which are coupled to receiver load circuits. The secondary winding voltages are regulated by control of the primary winding conduction interval. A supplemental winding is layer wound over the primary winding to transfer additional power to the load circuits. The primary winding may be electrically isolated from the secondary windings and from the supplemental winding.

9 Claims, 3 Drawing Figures

REGULATED POWER SUPPLY INCORPORATING A POWER TRANSFORMER HAVING A TIGHTLY COUPLED SUPPLEMENTAL POWER TRANSFER WINDING

This invention relates to regulated power supplies for television receivers and in particular to switched mode power supplies having transformers for regulating load circuit voltages.

Many of the circuits in television receivers require carefully regulated power supplies in order to operate properly. For example, if the horizontal and vertical deflection circuit supply voltages are permitted to vary in an uncontrolled manner, the size of the scanned raster may change, producing an undesirable visual effect. Additional receiver circuits may be subject to excessive electrical stresses or may be damaged if supply voltages are not held within acceptable limits.

One type of voltage regulating circuit utilizes a silicon controlled rectifier (SCR) coupled to an unregulated voltage source developed from the ac line. During conduction of the SCR, current flow from the unregulated supply charges a capacitor, establishing a regulated voltage level. The conduction time of the SCR is controlled to maintain a fixed regulated voltage level. Decreases in the ac line voltage or increased circuit loading will cause an increase in the SCR conduction time and an increase in line voltage will result in a decrease in SCR conduction time.

The previously described SCR regulated power supply is not economically incorporated in a receiver which provides input and output terminals electrically isolated from the ac line. Such an arrangement is required when it is desired to provide the receiver with the capability to accept a direct video signal input, for example, from a video tape recorder or a video disc player, or from a home computer. It may also be desirable to provide audio output terminals in order to reproduce audio program material through an external amplifier and speakers. These input or output interface terminals must be accessible by the user of the television receiver, yet provide electrical isolation from the ac line to eliminate any shock hazard. Providing this isolation may be difficult in a receiver having an SCR regulated power supply, since the SCR is normally connected directly to the unregulated supply. Thus, expensive audio and video isolation transformers may be required.

An arrangement for electrically isolating the receiver load circuits from the ac line via the high voltage power transformer is disclosed in a copending application entitled "Regulated Power Supply Circuit", Ser. No. 426,360, filed on Sept. 29, 1982, in the name of D. H. Willis. The circuit described in that application includes a transistor switch which permits current from an unregulated voltage supply to energize a primary winding of the high voltage transformer. This in turn energizes the electrically isolated load circuit windings in order to power the associated load circuits. A supplemental transformer winding aids in transferring power to the load circuits. The conduction time of the transistor switch is controlled in order to regulate the magnitude of the voltages induced across the load circuit windings. The primary winding comprises one half of a bifilar-wound coil pair with the other half of the coil pair operable as a catch winding to return stored energy in the coil back at the unregulated supply when the transistor switch is turned off. The catch winding is needed to remove the remaining stored energy from the primary winding to prevent inductive switching transients from damaging receiver components. This arrangement requires the previously described bifilar primary coil, which increases transformer cost and complexity, and effectively limits the transistor switch conduction duty cycle to a maximum of approximately 50%. This insures that all of the stored energy in the primary winding can be transferred to the catch winding. Limiting the switch duty cycle also limits the amount of energy that may be transferred to the load windings which may limit the ability of the power supply to accurately regulate the load circuit voltages under extreme line voltage and circuit loading conditions.

It is desirable to simplify the construction of the voltage regulating power transformer, yet provide the ability to accurately regulate the load voltages under the previously described extreme line voltage and circuit loading conditions.

In accordance with the present invention, a regulated power supply for a television receiver which includes a number of load circuits comprises an unregulated voltage source coupled to a first terminal of a primary transformer winding. The unregulated voltage source is coupled to the primary winding second terminal and selectively energizes the winding. Means are provided which power the load circuits in response to the energization of the unitary winding. A control circuit is coupled between the load circuits and the energizing means for controlling the operation of the energizing means to maintain a substantially constant voltage supply for the load circuits. A supplemental transformer winding overlays the primary winding and powers at least one of the load circuits in response to energization of the primary winding.

In the accompanying drawing.

Figure 1:
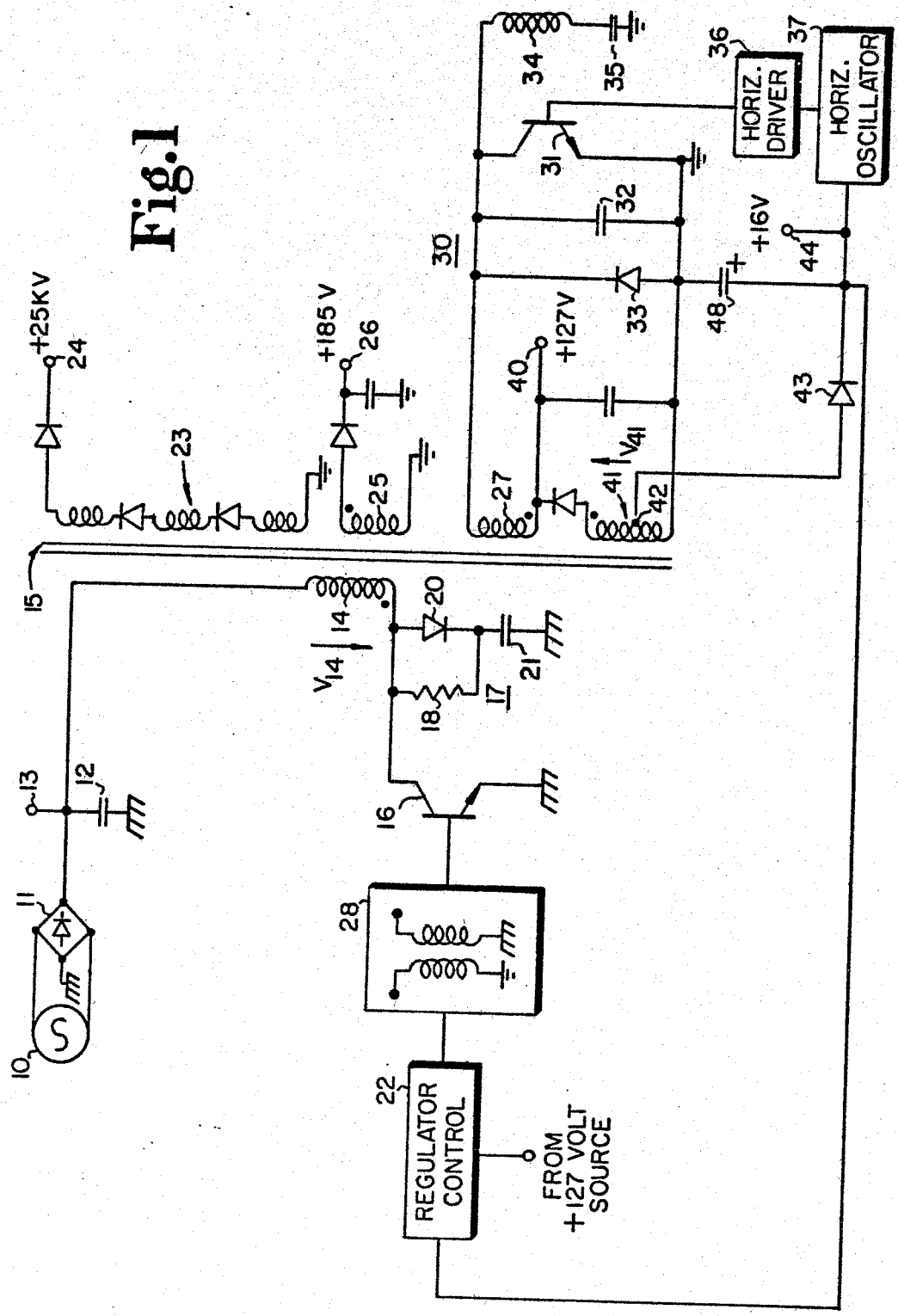
FIG. 1 is a schematic diagram of a television receiver regulated power supply constructed in accordance with the invention.

Referring to FIG. 1, an ac mains supply 10 is applied to a full-wave bridge rectifier 11 and a filter capacitor 12 to develop a source of unregulated voltage at a terminal 13. This unregulated voltage is applied to one terminal of a primary winding 14 of a high voltage power transformer 15. The other terminal of winding 14 is coupled to the collector of a transistor 16 and through a protection network 17, comprising a resistor 18, a diode 20 and a capacitor 21, to ground. Transistor 16 is switched by signals from a regulator control circuit 22 via an isolation transformer 28 to control the conduction of current from the unregulated voltage source through winding 14 in a manner that will be explained later.

Transformer 15 also includes a number of secondary windings and a tertiary winding 23, which generates a high voltage of the order of 25 KV at an ultor terminal 24 to be applied to the anode of a kinescope (not shown).

Among the secondary windings shown as comprising transformer 15 are winding 25, which provides a voltage which is rectified and filtered to develop a direct voltage of the order of 185 volts at a terminal 26 that may be used, for example, to power the kinescope drive circuits (not shown). Another secondary winding 27 is coupled to a horizontal deflection circuit 30, which comprises a horizontal output transistor 31, a retrace capacitor 32, a damper diode 33, a deflection yoke winding 34, and a deflection waveform S-shaping capacitor 35. Horizontal output transistor 31 is switched at a horizontal rate by signals from a horizontal driver circuit 36, which is controlled by a horizontal oscillator 37 in order to develop horizontal deflection current in deflection yoke winding 34. Winding 27 also generates a voltage which forms a regulated B+ supply at a terminal 40 of the order of 127 volts.

The voltage generated via the secondary and tertiary associated load circuits are carefully regulated in the following manner, which will be explained with reference to FIG. 2. Transistor 16 is rendered conductive by a switching signal at a time $t_1$ from regulator control circuit 22, for example Matsushita AN5900, being applied to the base of transistor 16, thereby raising the base-emitter voltage ($V_{BE16}$), as shown in FIG. 2g. Current ($I_{14}$) flows in primary winding 14 of transformer 15, as shown in FIG. 2a, from the unregulated voltage supply at terminal 13. Inductive energy is stored in winding 14 and in the magnetically permeable core of transformer 15. When transistor 16 is turned off, at time $t_3$, the voltage across winding 14 ($V_{14}$) increases, as shown in FIG. 2b, and induces voltages across load windings 23, 25 and 27 by transformer action in order to power the previously described load circuits, such as horizontal deflection circuit 30.

The amount of energy that may be transferred in this way is dependent on factors which include the conduction time of transistor 16 and the degree of magnetic coupling between the primary winding 14 and the load windings. As previously described, it may be desirable to provide the receiver with direct video and audio input and output capability in order to interface external components, such as video sources, home computers or separate audio equipment, with the receiver. This requires that the user accessible interface connectors or terminals on the receiver be electrically isolated from the ac line in order to prevent the possibility of a user receiving a shock. This isolation may be accomplished by electrically insulating the "hot" primary winding 14 from the load windings. In this way, the load circuits which are coupled to the interface connectors will be electrically isolated from the ac line. This is shown in FIG. 1 by the use of different ground symbols to illustrate the ac line "hot" ground as compared to the isolated "cold" ground.

In the interest of safety, guidelines and requirements may exist which define the amount of insulating material that is needed or the physical separation between windings, particularly between the high voltage ultor winding and the low voltage windings, that is required. These insulation and physical separation requirements may produce a transformer having a reduced primary to load winding magnetic coupling compared to a transformer that does not provide as great a degree of electrical isolation. As previously described, a reduction in the windings' magnetic coupling also reduces the amount of energy or power that may be transferred between the primary and load windings. Under certain severe receiver operating conditions, such as low ac line voltage, receiver start-up, or high load circuit power requirements, there may be insufficient power transferred between primary winding 14 and the load windings to maintain accurate regulation of the load circuit supply voltages.

To prevent a degradation of the voltage regulating capabilities of the receiver under these conditions, a supplemental winding 41 of transformer 14 is provided and operates in the following manner. Supplemental winding 41 is coupled to primary winding 14 more tightly than are the load windings 23, 25 and 27. When transistor 16 turns off, at time $t_3$, this coupling causes the voltage across winding 41 ($V_{41}$) to increase, as shown in FIG. 2c. This voltage is rectified and filtered and provides the source of regulated B+ voltage at terminal 40 and also provides power to operate horizontal deflection circuit 30. An intermediate tap 42 on winding 41 provides a low voltage source of the order of 16 volts via a diode 43 and a capacitor 48 at a terminal 44. The 16 volt source is also applied to and provides operating power for horizontal oscillator 37 and for regulator control circuit 22. In FIG. 1, the level of the 127 volt source is shown as sampled by regulator control circuit 22 to control the switching of transistor 16, in order to maintain accurately regulated load circuit supply voltages. Sampling of the 127 volt supply is shown for example only. Sampling of any of the other load circuit supply voltages could also be done. Supplemental winding 41 is magnetically tightly coupled to primary winding 14 by constructing primary winding 14 and supplemental winding 41 as layer windings with supplemental winding 41 wound to overlay primary winding 14, as shown in FIG. 3. By winding the transformer 15 in this way, it is possible for supplemental winding 41 to transfer between 20% to 50% of the total power required by the load circuits. Close magnetic coupling between the primary winding 14 and supplemental winding 41 as a result of the layer winding arrangement produces accurate regulation of the supplemental winding voltage. This permits the supplemental winding 41 to be used as a source of one or more regulated voltages for the receiver, such as the +16 volt supply as shown in FIG. 1. The potential difference between primary winding 14 and supplemental winding 41 is relatively small, as contrasted to the potential difference between primary winding 14 and high voltage winding 23, for example. This permits windings 14 and 41 to be layer-wound as previously described in order to provide tight magnetic coupling yet allows windings 14 and 41 to be electrically isolated through the use, for example, of 20 mils of Mylar between windings 14 and 41.

FIGS. 2d and 2e illustrate the waveforms of the current flow through windings 27 and 41, respectively. Current flow in winding 27 ($I_{27}$) will closely resemble the deflection current in deflection yoke winding 34. Current flow in supplemental winding 41 ($I_{41}$) decreases as the stored energy in the winding decreases. When this energy is depleted, current flow ceases. Current flow in winding 41 may also be terminated by the switching of transistor 16 terminating conduction of winding 14. The collector-emitter voltage of horizontal output transistor 31 ($V_{BE31}$), illustrating the horizontal retrace pulse, is shown in FIG. 2f.

When transistor 16 is turned off, by action of the switching pulses from regulator control circuit 22, the stored inductive energy in winding 14 causes the collector-emitter voltage of transistor 16 to rise. If this energy is not rapidly removed from winding 14, the collector-emitter voltage of transistor 16 may increase to a point at which transistor 16 is damaged. The tight magnetic coupling between primary winding 14 and supplemental winding 41 causes winding 41 to act as a clamp winding which limits the extent to which the collector voltage of transistor 16 can increase. This occurs because winding 41 expeditiously removes much of the energy from winding 14, as previously described, so that a relatively small amount of energy remains. Protection network 17 is provided, however, to aid in removing this energy in order to protect transistor 16. During the time transistor 16 is conducting, capacitor 21 discharges through resistor 18 and the collector-emitter path of transistor 16 to ground to a level determined by the voltage drop across resistor 18. When transistor 16 turns off, its collector voltage rapidly rises, creating an inductive voltage spike as shown in FIG. 2b. When the collector voltage exceeds the combination of the voltage level on capacitor 21 and the conduction threshold voltage of diode 20, diode 20 is rendered conductive, permitting winding 14 energy to charge capacitor 21. The voltage represented by the spike in FIG. 2b is therefore dissipated by capacitor 21, rather than by transistor 16, thereby protecting transistor 16. As described, this excess charge on capacitor 21 is removed via resistor 18 during conduction of transistor 16. Although some is removed from primary winding 14 by protection network 17, most of the energy in winding 14 is transferred to the loads by either the load windings or by supplemental winding 41.

Figure 2:
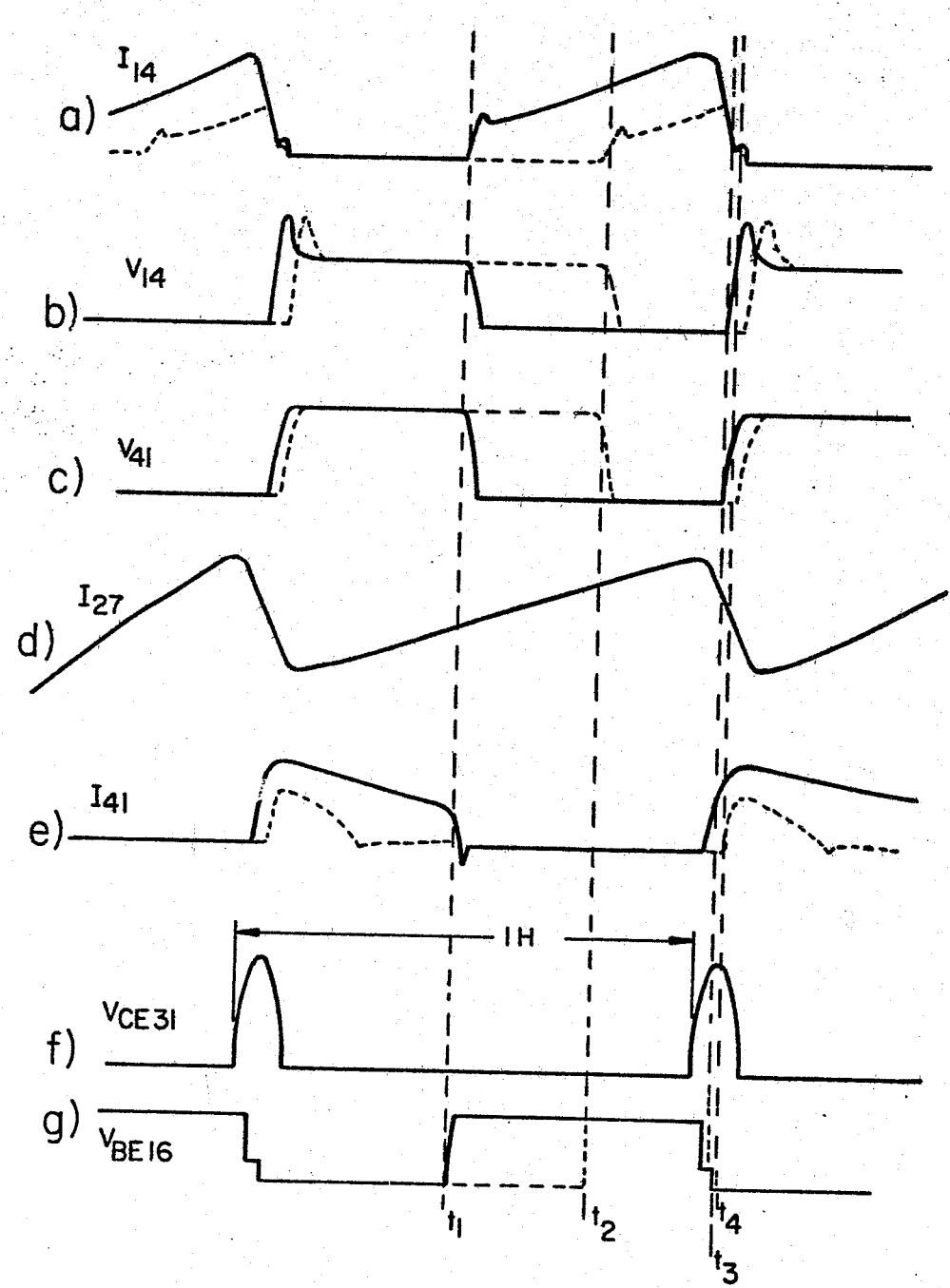
FIG. 2 illustrates waveforms associated with the circuit of FIG. 1.
Figure 3:
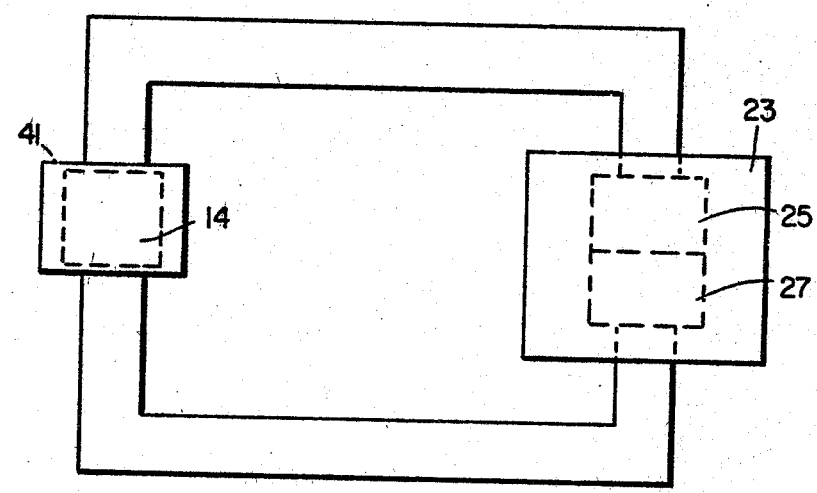
FIG. 3 is a diagramatic representation of a high voltage transformer constructed according to the invention.

As the load circuit power requirements decrease or the ac line voltage increases, transistor 16 conducts for a shorter period of time each horizontal interval, as shown by the dashed lines in the waveforms of FIG. 2. Transistor 16 is switched on at a time $t_2$ and off at time $t_4$, resulting in a decreased current flow in primary winding 14 and supplemental winding 41.

The regulator circuit of FIG. 1 therefore provides accurate load circuit supply voltage regulation even under severe receiver operating conditions with a relatively simple high voltage transformer, yet provides ac line isolation of the load circuits to permit interfacing with external video or audio components.

What is claimed is:

1. A regulated power supply for a television receiver incorporating a plurality of load circuits comprising:
   an unregulated voltage source electrically isolated from said load circuits;
   a transformer core having first and second transformer core legs;
   a first transformer winding, wound on said first transformer core leg and having first and second terminals, said first terminal coupled to and electrically nonisolated from said unregulated voltage source;
   means, coupled to said first transformer winding second terminal for selectively energizing said first winding from said unregulated voltage source;
   a second transformer winding, wound on said second transformer core leg, electrically isolated from said first transformer winding, for powering a given one of said load circuits in response to the energization of said first transformer winding;
   means for controlling the operation of said energizing means to maintain a constant voltage supply for said load circuits; and
   a third transformer winding electrically isolated from said first transformer winding and wound on said first transformer core leg to overlay said first transformer winding for powering at least one of said load circuits in response to the energization of said first transformer winding.

2. The arrangement defined in claim 1, wherein said means for selectively energizing said first winding comprises a transistor switch.

3. The arrangement defined in claim 1, wherein said means for controlling the operation of said energizing means comprises a pulse width modulator.

4. The arrangement defined in claim 1, further comprising a plurality of transformer load windings wound on said second transformer core leg.

5. The arrangement defined in claim 1, wherein said first transformer winding is more closely coupled magnetically to said third transformer winding than to said second transformer winding.

6. The arrangement defined in claim 1, wherein said given one of said load circuits comprises a line deflection circuit, said line deflection circuit developing a retrace pulse across said second transformer winding.

7. The arrangement defined in claim 6, wherein said energizing means causes said energization of said first transformer winding to be terminated during the interval of said retrace pulse.

8. The arrangement defined in claim 1, wherein energy stored in said transformer core, during the time said first transformer winding is energized, is maintained in said transformer core by energization of said third transformer winding, when said first transformer winding is not energized, for supplemental transfer to at least one of said load circuits by said third transformer winding.

9. The arrangement defined in claim 8, wherein substantially all of said energy stored in said transformer core during energization of said first transformer winding is removed before energization of said first transformer winding reoccurs.

* * * * *